Patented Dec. 11, 1951

2,578,523

UNITED STATES PATENT OFFICE 2,578,523

POLYTETRAFLUOROETHYLENE PACKING MATERIAL AND PROCESS FOR MAKING SAME

Walter E. Llewellyn, Nutley, N. J., assignor to E. I. du Pont de Nemours and Company, Wilmington, Del., a corporation of Delaware No Drawing. Application June 30, 1950, Serial No. 171,537

7 Claims. (Cl. 18—55)

This invention relates to a new and improved plastic packing and gasket material adapted for use in the packing of the stuffing boxes of pumps, valves and other equipment where a tight seal is required which is resistant to corrosion and which does not break down at moderately elevated temperatures. This invention is a continuation-in-part of my copending application S. N. 735,535, filed March 18, 1947, now abandoned.

A recent advance in the art of packing devices for reciprocable or rotating shafts has been the use of polytetrafluoroethylene rings as packing elements. These rings generally have been made by molding pulverulent polytetrafluoroethylene followed by heating the shaped ring at a sintering temperature to increase its strength. Failures of these rings have occurred, due to the high gland pressure required to produce a tight fit.

An object of this invention is to provide a process for making polytetrafluoroethylene packing of improved resiliency. Another object of this invention is to prepare a new oriented, highly resilient form of polytetrafluoroethylene suitable for use as a packing and gasket material. A still further object is the preparation of an improved polytetrafluoroethylene for the use in the handling of corrosive liquids. A still further object is the production of a polytetrafluoroethylene composition with or without lubricant which under continuous contact with corrosive material retains its sealing properties substantially unimpaired. Additional objects and advantages will be apparent as the invention is hereinafter described in detail.

The objects of this invention are accomplished by passing particles of unsintered polytetrafluoroethylene through milling rolls repeatedly, and continuing this treatment until the solid polytetrafluoroethylene changes its physical appearance and assumes the form of matted shreds, flakes or strands of the polymer. Polytetrafluoroethylene particles in the micro-pulverized, pulverized, granular, or lump forms, as obtained by Plunkett U. S. 2,230,654, Brubaker U. S. 2,393,-967, and Joyce U. S. 2,394,243, and the very small colloidal particles obtained by Renfrew, application Serial Number 713,385, filed November 30, 1946, now U. S. Patent 2,534,058, and Berry, application Serial Number 107,137, filed July 27, 1949, now abandoned are illustrative of the types of polytetrafluoroethylene particles which may be employed in the practice of this invention.

In the use of milling rolls in carrying out the process of this invention, solid polytetrafluoroethylene in any of the aforesaid forms may be passed through the rolls whereby flattened lumps or particles are obtained. Upon obtaining this result, the operator of the rolls should preferably reset the rolls so as to obtain a reduced clearance between the same. After repeating these operations several times, there is obtained a sheet or membrane of oriented polytetrafluoroethylene in the form of matted shreds or flakes. Alternatively, the lumps or particles of polytetrafluoroethylene may be rolled repeatedly by increasing the thickness of the roll feed, or when a sheet is obtained, by merely doubling the sheet and passing it doubled through the rolls without resetting the roll clearance. In other words, some time during the rerolling process, work should be done on the polymer by rolling it under pressure (i. e., under compression). This compression may be accomplished in either of two ways or both, that is, by reducing the roll clearance and/or increasing the thickness of the roll feed for a given clearance.

The rolled product may comprise a skin-like sheet of matted shreds or flakes, adhering more or less firmly together. The sheet or skin may be relatively easy to pull apart into small shreds of the polymer or it may be a very tough sheet, depending upon the amount of work done on the polymer and the type of polymer particles employed in the process.

The matted shreds of polytetrafluoroethylene obtained as above described, may be used as such or reduced to a pulpy mass by conventional mechanical shredding processes. The resulting mass may be used as a packing material, with or without lubricants and/or binders. This material may also be formed into a string or a braided form of packing material.

One particular method for preparing the pulpy mass of polytetrafluoroethylene is to prepare a slurry of the rolled matted shreds in a liquid medium such as water and/or organic liquids. This may be accomplished by the use of a beater conventionally used in the wood pulp and paper industries, and the pulpy mass of polymer separated out of the slurry by any conventional means, such as those used in the above-mentioned industries, and then subsequently dried. The resulting pulpy material, which comprises smaller shreds than those existing prior to mechanical shredding, may be used as a packing or gasket material.

As mentioned above, it may be desirable that the matted shreds of polytetrafluoroethylene have incorporated therein various binders, fillers (e. g.

asbestos), and/or lubricants (e. g. graphite or such unctuous materials as petroleum lubricants, silicon resins, water-insoluble soaps, such as calcium stearate and water-soluble soaps, such as potassium stearate). Lubricants such as graphite may be added to the polymer by the use of a mortar and pestle. It has also been found practical, where a binder is desirable, to slurry the oriented polytetrafluoroethylene shreds in a liquid medium having dissolved therein the desired binder. Upon the evaporation of the solvent medium, the binding material or materials can thus be deposited uniformly throughout the oriented polytetrafluoroethylene.

The incorporation of binding material and/or lubricants can be accomplished by mixing the same into the polytetrafluoroethylene roll feed, or by impregnating the rolled oriented product therewith. The rolling technique may differ somewhat where the lubricant is incorporated in the roll feed; however, one skilled in the art of rolling can easily comprehend this difference and the operator modify his technique accordingly.

The amounts of modifiers (e. g., lubricants or binding material) present in the rolled oriented product, and the chemical composition of the said binder or lubricant is dependent upon the service under which the rolled product is to be used; for example, the presence or absence of solvents of corrosive liquids which would erode or attack the modifying material influences the choice of such lubricants or binders. For certain purposes, the rolled oriented polytetrafluoroethylene is entirely satisfactory per se without the incorporation of a binder or a lubricant for use as a packing or gasket material, especially in view of its properties of chemical inertness and thermal stability at temperatures below 300° C.

This invention will be further illustrated but not limited by the following examples, in which all parts are by weight unless otherwise specified.

*Example 1*

Granular particles of unsintered polytetrafluoroethylene, prepared by the process described by Brubaker in U. S. Patent 2,393,967, are fed into the bite of two milling rolls fifteen inches in diameter set with a clearance of $\frac{1}{16}$ inch between the rolls. After one pass through the rolls, a weak sheet is obtained, which is then rerolled twelve (12) times to produce a mass of matted shreds or flakes. Before each pass, the sheet is folded twice to produce four (4) thicknesses in order to increase the effective rolling pressure. The wadding thus obtained is highly resilient, and is found to give excellent results when used as a valve packing material.

*Example 2*

Granular particles of unsintered polytetrafluoroethylene, prepared by the process described by Brubaker in U. S. Patent 2,393,967 are fed through a "Mikropulverizer" equipped with a screen having 0.039 inch holes. The product of this pulverization is mixed with petrolatum (9 parts of polytetrafluoroethylene to 1 part of petrolatum by weight) and rolled as in Example 1, except that it is rolled a total of 30 times, until the petrolatum is uniformly dispersed and the rolled polymer oriented into the form of matted flakes, suitable for use as a pump packing material.

*Example 3*

Very small colloidal particles of unsintered polytetrafluoroethylene, prepared by drying an aqueous suspensoid of polytetrafluoroethylene obtained by the process described by Renfrew in application Serial Number 713,385, are mixed with graphite particles in the weight ratio of 9 parts of polytetrafluoroethylene to 1 part of graphite and the mixture is fed to the bite of two rolls 6 inches in diameter. The rolls are set to a clearance of $\frac{1}{8}$ inch. The mixture of polymer and graphite is rolled as in Example 1 with the exception that the increased effective rolling pressure is achieved by reducing the roll clearance 4 times during the twelve passes, with a final roll clearance of $\frac{1}{32}$ inch. The product of this operation is a uniformly dispersed mixture of graphite in polytetrafluoroethylene in the form of tough oriented matted shreds. The matted shreds are mechanically torn apart and are then molded under a pressure of 5 tons per square inch at room temperature into the form of packing rings.

*Example 4*

The matted shreds of polytetrafluoroethylene as prepared in Example 1 are made into a pulpy mass of smaller pieces by means of a wood pulp beater. The smaller shreds of polymer resulting from the beating action are sufficiently wet to form a thick slurry with an ethanol solution comprising 82 parts by weight of ethanol, 1 part by weight of polyvinylbutyral and 1 part by weight of dibutyl sebacate. The shreds are then formed by compression at room temperature into a doughnut-shaped packing ring. The solvent is removed by evaporation yielding an oriented resilient, doughnut-shaped ring containing approximately 0.2% of binder. When employed as a packing material the product may be used per se or may be immersed in an oil lubricant; when an oil lubricant is employed, the product absorbs up to 35% by weight of oil, dependent upon the type of oil. Lubricated molded packing rings thus prepared are used as shaft packing for centrifugal pumps handling corrosive liquids, and give satisfactory service without leakage or failure of the pump for a period of thirty months. In contrast with this, the most satisfactory packing available for this use prior to this invention was molded rings prepared by compression molding powdered micropulverized polytetrafluoroethylene, which was obtained by the process of Brubaker, U. S. Patent 2,393,967. However, these molded rings had to be sintered in order to make them strong enough to handle and fit around the pump shaft. These sintered rings when used on the same centrifugal pump as described above for handling corrosive liquids failed after eight hours of service.

*Example 5*

One hundred parts of colloidal sized particles of polytetrafluoroethylene obtained by drying the particles obtained by coagulating an aqueous colloidal dispersion of polytetrafluoroethylene made by the process described by K. L. Berry in application Serial Number 107,137, are mixed with seven parts of potassium stearate, and the mixture is fed between two milling rolls six inches in diameter. The rolls are set to a clearance of $\frac{1}{16}$ inch at the beginning, and the mixture is passed between the rolls thirty times. Three times during the total rolling process, the roll clearance is reduced until the final roll clearance is $\frac{1}{32}$ inch. Between each of the thirty passes, the mixture is folded twice (i. e., to give four thicknesses). The product resulting from the thirty passes through the rolls is a uniform mixture of potassium stearate and polytetrafluoroethylene in the form of a very tough thin skin composed of matted shreds which are practically impossible to pull apart by hand, but which have the very desirable high resilience necessary for a useful packing and gasket material.

The packing material prepared as disclosed in Example 5 was found to be effective for sealing the rotating shaft in a stirrer-equipped autoclave containing hydrogen sulfide under 5000 pounds per square inch pressure, no leakage occurring during approximately 100 hours of use. In similar service at lower pressure asbestos packing failed almost immediately.

One of the advantages of the packing material of this invention is that it ordinarily will not stick to a shaft especially when lubricants (e. g.) graphite, etc. are present.

As many apparently widely different embodiments of this invention may be made without departing from the spirit and scope thereof, it is to be understood that I do not limit myself to the specific embodiments thereof except as defined in the appended claims.

I claim:
1. A process for the manufacture of a packing and gasket material which comprises passing particles of unsintered polytetrafluoroethylene between milling rolls a plurality of times, and repeatedly rerolling the resultant compacted mass until the polytetrafluoroethylene changes its physical appearance and assumes the form of matted shreds, flakes, or strands of the polymer, said mat being made up of unsintered polytetrafluoroethylene which is tough and resilient and suitable for use as a gasket material.

2. The process of claim 1 wherein the repeated rolling of said polytetrafluoroethylene is carried out by increasing the effective rolling pressure upon the polymer.

3. The process of claim 1 wherein a lubricant is mixed with the said particles of polytetrafluoroethylene prior to passing between said rolls.

4. The process of claim 3 wherein the lubricant is petrolatum.

5. The process of claim 3 wherein the lubricant is pulverized graphite.

6. A process for the manufacture of a packing and gasket material which comprises passing colloidal-sized particles of unsintered polytetrafluoroethylene through the nip of two rolls to obtain the polymer in the form of a weak fragile unsintered sheet, and thereafter passing the unsintered polymer through the rolls repeatedly under increasing pressure until the polymer assumes the form of a sheet of matted shreds, said mat being made up of unsintered polytetrafluoroethylene which is tough and resilient and suitable for use as a gasket material.

7. A packing ring cold molded from the matted shreds produced according to claim 1.

WALTER E. LLEWELLYN.

REFERENCES CITED

The following references are of record in the file of this patent:

UNITED STATES PATENTS

| Number | Name | Date |
|---|---|---|
| 2,185,789 | Jacque | Jan. 2, 1940 |
| 2,400,099 | Brubaker et al. | May 14, 1946 |